United States Patent Office 3,201,359
Patented Aug. 17, 1965

3,201,359
PROCESS FOR PREPARING WAX EXTENDED
POLYURETHANE FOAMS
Elbert C. Herrick, Chesapeake, Va., and William J. Stout, Wilmington, and Steven G. Belak, Claymont, Del., assignors to Sun Oil Company, Philadelphia, Pa., a corporation of New Jersey
No Drawing. Filed June 19, 1964, Ser. No. 376,571
3 Claims. (Cl. 260—2.5)

This invention relates to extended polyurethane foams. More particularly, the invention relates to polyurethane foams extended with a particular type of wax containing composition.

This application is a continuation-in-part of our earlier application, Serial No. 117,508, filed June 16, 1961.

Extended foams differ from impregnated foams in that impregnants are added after the foam is formed. Extenders are added before the foam is formed. It has been proposed in the prior art to impregnate completed foams with various materials. In many instances and particularly in the case of rigid foams, the impregnating material does not penetrate deeply into the foam. We have found that a very complete and thorough dispersion is obtained when the material is added prior to the foaming step. In addition, we have found that large amounts of certain types of waxes can be added to the foam ingredients without deflating the foam. The foams prepared by the process of the invention have excellent resistance to moisture and improved color stability in addition to the usual properties of urethane foams.

More specifically, we have found that blends of wax, certain fatty organic materials which resemble waxes in physical properties and emulsifiers, are very compatible with the foam ingredients and that they remain in liquid form during the mixing of the ingredients and subsequent foaming step. It is possible to prepare the blends in flake form, and when the flakes are stirred into the polyol, they dissolve, and the foam component remains liquid at ambient temperature. Thus, the foaming process can be accomplished without the application of heat or with the application of very low heat. Since the polyurethane foam reaction is exothermic and since the foaming step requires precise heat control due to the sensitivity of the ingredients, e.g. the blowing agents, the fact that the wax blends form a homogeneous mixture with the polyol at ambient temperatures is a distinct advantage.

The ingredients and reactant ratios employed in preparing the extended foams of the invention are those which are customarily used and the reaction can be carried out in the usual way as set forth in the literature. Suitable references include Saunders et al., Polyurethanes: Chemistry and Technology, vol. 1, Interscience, 1962 (particularly pages 219–260), and Dombrow, Polyurethanes, Reinhold, 1957 (particularly pages 75–105). The organic polyisocyanate is usually employed in such an amount that there is an excess of available isocyanate groups over the total number of hydroxyl groups from the polyol. Suitable stoichiometric amounts range from 0.7:1.0 to 1.5:1.0

A variety of organic polyisocyanates may be employed in producing the foams of the invention, although aromatic diisocyanates are generally used. Diisocyanates include 2,4 and 2,6 toluene diisocyanates and mixtures thereof, 1,4 and 1,5 naphthalene diisocyanate, phenyl diisocyanates, such as 4,4'-diphenylmethane diisocyanate, p-dixylylmethane-4,4'-diisocyanate and triisocyanates such as diphenyl-4,6,4'-triisocyanate.

Polyols having a molecular weight ranging from about 500 to about 10,000 containing at least two reactive hydrogens as determined by the Zerewitinoff method are used. These include polyester amides, polyesters and polyethers. Examples are polyoxyalkylene diols and triols, sorbitol polyethers, polyisocyanate modified polyoxyalkylene diols and triols, castor oil and the adipates, succinates, sebacates and azelates of ethylene and propylene glycols formed by reaction with the appropriate acids. The degree of cross-linking of the foam can be varied by the type of polyol selected and rigid, semi-rigid and flexible extended foams can be prepared as desired.

The wax blend used to extend the foams is a mixture of a wax, a waxy fatty organic material and an emulsifier. The blend is employed in amounts ranging from 5 to 50 wt. percent based on the total foam ingredients.

The wax preferably has a melting point in the range of from about 100° F. to about 150° F. and a viscosity of 40 to 55 Saybolt Seconds at 210° F. Natural waxes, synthetic waxes and waxes derived from petroleum processing can be used, and petroleum derived waxes such as slack waxes, scale waxes, petrolatum and the like are preferred. The wax is usually present in the blend in amounts ranging from 20 to 60 wt. percent.

The waxy fatty organic materials employed are high molecular weight organic fatty acids, fatty alcohols, fatty esters and fatty materials prepared from these by chemical modification and treatment. The latter materials may be synthetically made or used as they are found or extracted from vegetable and animal sources. Specific examples are fatty acids such as stearic acid, palmitic acid, myristic acid, oleic acid and linoleic acid; fatty alcohols such as octadecanol and tetradecanol; and fatty esters such as cetyl plamitate, and methyl stearate. The waxy fatty organic materials employed contain from 10 to 40 carbon atoms. The waxy fatty organic material is employed in amounts ranging from 20 to 60 wt. percent.

It is not essential that the wax blend be prepared before it is added to the polyol; however, this technique is much preferred.

Suitable emulsifiers include polyoxyethylene fatty alcohol ethers, polyglycol fatty acid esters, polyoxyethylene modified fatty acid esters, polyoxyethylene-polyol fatty acid esters and the like. It is preferred that the emulsifier be non-ionic, although ionic materials can be present. The preferred HLB range is 10–18 (Hydrophile-Lipophile Balance, see Griffin, Journal of the Society of Cosmetic Chemists, 1949, No. 1, pages 311–326). The emulsifier can be present in amounts ranging from 5 to 25 wt. percent.

It should be noted that many of the wax blends employed as extenders in the foams of the invention are emulsifiable with water, but this property is not essential to their utility as extenders. All that is required is that the blend contain a wax having the characteristics set forth above, a waxy fatty organic material as defined above and an emulsifier. The proportions of ingredients set forth in the specification are exemplary rather than critical.

It is the usual practice to use a catalyst. Compounds such as bismuth nitrate, lead 2-ethylhexoate, lead benzoate, lead oleate, stannous octoate, stannous oleate, butyltin trichloride and tertiary amines such as triethylene diamine, are suitable catalysts. Tertiary amines are the preferred catalyst.

An emulsifier or other surfactant is often added to the reaction mixture to enhance foaming. Examples are polyethylene glycol ricinoleate, sorbitan monolaurate and sodium dioctyl sulfosuccinate. Silicone oils such as polyoxyalkylene-polysiloxane copolymers can be used as well, and they are preferred. This emulsifier is distinct from the emulsifier which is used in conjunction with the wax and waxy material ingredients.

Suitable blowing agents include water, nitrogen-types, halohydrocarbons such as $CCl_3F$, $CCl_2F$-$CCl_2F$ and $C_2Cl_3F_3$ and more than one type of blowing agent can be used if desired.

The foam may be prepared by batch, semi-continuous or continuous methods using bench equipment or commercial foam machines. The usual procedure is to stir the wax blend into the polyol at a temperature ranging from 40° F. to 200° F. to obtain a thorough dispersion. The preferred temperature ranges from 100° F. to 150° F. When this component is cooled to ambient temperature, it remains a homogeneous liquid. In one embodiment, the catalyst, emulsifier and water are mixed in a separate container, and then, blended with the wax blend-polyol component, diisocyanate is added and foaming begins immediately. In another embodiment the polyol is partially reacted with about one-half of the isocyanate to form a prepolymer which is mixed with the wax blend to form a first component. The catalyst, emulsifier, and additional diisocyanate are mixed to form a second component. The two components are then mixed together, and a halohydrocarbon blowing agent is added. The temperature is raised above the boiling point of the halohydrocarbon, and the foaming reaction proceeds. Those skilled in the art can select the sequence of adding the polyol, the wax blend, the diisocyanate, the water and/or the halohydrocarbon and the application of heat so that the foaming step is kept under control leading to the formation of the desired type of foam.

Pressures ranging from 0.1 to 10 atmospheres and temperatures ranging from 40° F. to 200° F. can be used in the process. Ordinarily, the process will be conducted at ambient pressure and with the application of a minimum amount of heat for mixing the reactants, foaming and curing.

The invention is further illustrated by the following non-limiting example:

20 grams of a wax blend consisting of a homogeneous mixture of 40 wt. percent paraffin wax having a melting point of 130° F., 40 wt., percent of single press stearic acid and 20 wt. percent of a polyoxyethylene stearate having an HLB number of 15.0 and a specific gravity of 1.08–1.13 was added to 85.24 grams of a polyether having a hydroxyl number of 490, Hoeppler viscosity of 10,000, theoretical molecular weight of 760 and an acid number of 0.30. The polyether is a condensation product of sorbitol with propylene oxide. The wax blend and polyol were worked into a homogeneous mixture by stirring at a temperature of 130° F. This mixture, constituting the first foam component, was cooled to ambient temperature (about 75° F.) and the mixture remained in liquid form. A second component containing 0.90 gm. silicone oil (polyoxyalkylene-polysiloxane copolymer), 0.70 gm. triethylene diamine, 65.56 gm. toluene diisocyanate and 30.6 gm. trichloromonofluoro-methane was prepared. The second component was mixed into the first component, and the mixture foamed readily at ambient temperature to a rigid foam. The wax blend was evenly distributed in the foam.

The example shows that polyurethane foams can be extended with the wax blends described at mild conditions to produce uniform foams.

The extended foams of the present invention have utility in insulation, packaging, filtering, flotation gear and the like.

It is within the scope of this disclosure to modify the process of the invention by the incorporation of functional foam ingredients such as fillers and fire retardants. Other modifications which would occur to those skilled in the art are intended to be within the scope of this disclosure.

We claim:
1. A process for the production of a wax extended polyurethane foam comprising the steps of
   (I) forming a part component comprising
      (a) a polyol containing active hydrogen and having a molecular weight ranging from about 500 to about 10,000 and
      (b) from 5 to 50 wt. percent based on the total foam ingredients of a blend of
         (1) a wax derived from petroleum processing having a melting point in the range of from 100° F. to 150° F.,
         (2) a waxy fatty organic material selected from the group consisting of high molecular weight organic fatty acids, fatty alcohols and fatty esters containing 10 to 40 carbon atoms and
         (3) a non-ionic emulsifier for (1) and (2),
   (II) forming a second component containing an aromatic diisocyanate, a tertiary amine catalyst and an emulsifier for polyurethane foams,
   (III) mixing the first and second components together in the presence of a liquefied halohydrocarbon blowing agent and
   (IV) foaming the mixture at a temperature in the range of 40° F. to 200° F.
2. The process according to claim 1 in which the blend contains paraffin wax, stearic acid and a polyoxyethylene stearate emulsifier.
3. The process according to claim 2 in which the blend is in flake form.

References Cited by the Examiner

UNITED STATES PATENTS

| | | | |
|---|---|---|---|
| 2,729,618 | 1/56 | Miller et al. | 260—28 |
| 2,744,075 | 5/56 | Roberts | 260—2.5 |
| 2,941,967 | 6/60 | Moller | 260—2.5 |
| 2,962,183 | 11/60 | Rill et al. | 260—2.5 |
| 2,983,504 | 5/61 | Reuter et al. | 260—2.5 |
| 3,067,149 | 12/62 | Dombrow et al. | 260—2.5 |
| 3,070,556 | 12/62 | Merten et al. | 260—2.5 |

FOREIGN PATENTS

| | | |
|---|---|---|
| 773,265 | 4/57 | Great Britain. |
| 848,910 | 9/60 | Great Britain. |
| 852,379 | 10/60 | Great Britain. |

LEON J. BERCOVITZ, *Primary Examiner.*